United States Patent
Tajika (10) Patent No.: US 11,411,270 B2
(45) Date of Patent: Aug. 9, 2022

(54) BATTERY SYSTEM AND MOVING BODY

(71) Applicant: SoftBank Corp., Tokyo (JP)

(72) Inventor: Akihiko Tajika, Saitama (JP)

(73) Assignee: SoftBank Corp., Tokyo (JP)

( * ) Notice: Subject to any disclaimer, the term of this patent is extended or adjusted under 35 U.S.C. 154(b) by 3 days.

(21) Appl. No.: 16/739,162

(22) Filed: Jan. 10, 2020

(65) Prior Publication Data
US 2020/0153066 A1 May 14, 2020

Related U.S. Application Data

(63) Continuation of application No. PCT/JP2018/023171, filed on Jun. 18, 2018.

(30) Foreign Application Priority Data

Jul. 13, 2017 (JP) .............................. JP2017-137226

(51) Int. Cl.
*H01M 8/22* (2006.01)
*H01M 12/02* (2006.01)
(Continued)

(52) U.S. Cl.
CPC ............. *H01M 12/02* (2013.01); *B60L 50/64* (2019.02); *B60L 53/51* (2019.02); *B60L 58/27* (2019.02);
(Continued)

(58) Field of Classification Search
CPC ...... H01M 12/02; H01M 12/08; H01M 12/04; H01M 12/06; H01M 2220/20;
(Continued)

(56) References Cited

U.S. PATENT DOCUMENTS

| 5,356,729 A | 10/1994 | Pedicini |
| 2011/0195321 A1 | 8/2011 | Takahashi |

(Continued)

FOREIGN PATENT DOCUMENTS

| JP | H08510085 A | 10/1996 |
| JP | 2004098721 A | 4/2004 |

(Continued)

OTHER PUBLICATIONS

International Search Report and (ISA/237) Written Opinion of the International Search Authority for International Patent Application No. PCT/JP2018/023171, mailed by the Japan Patent Office dated Sep. 18, 2018.

(Continued)

*Primary Examiner* — Raymond Alejandro (57) ABSTRACT

While lithium-air batteries have been known, in which oxygen in the air is used as a positive electrode active material and lithium is used as a negative electrode active material, it is desired to provide a battery system capable of efficient utilization of oxygen. A battery system is provided, including: a lithium-oxygen battery; an oxygen compressing unit configured to compress oxygen released from the lithium-oxygen battery; a storage unit configured to store oxygen compressed by the oxygen compressing unit; and an oxygen supplying unit configured to supply oxygen stored in the storage unit to the lithium-oxygen battery.

21 Claims, 4 Drawing Sheets

(51) Int. Cl.
  *B60L 58/27* (2019.01)
  *B60L 53/51* (2019.01)
  *B60L 50/64* (2019.01)
  *B64D 27/24* (2006.01)
  *H01M 12/08* (2006.01)

(52) U.S. Cl.
  CPC ............ *B64D 27/24* (2013.01); *H01M 12/08* (2013.01); *B60L 2200/10* (2013.01); *H01M 2220/20* (2013.01)

(58) Field of Classification Search
  CPC .......... B60L 58/27; B60L 53/51; B60L 50/64; B60L 2200/10; B64D 27/24
  See application file for complete search history.

(56) References Cited

U.S. PATENT DOCUMENTS

| | | |
|---|---|---|
| 2012/0040253 A1 | 2/2012 | Hermann |
| 2014/0232354 A1 | 8/2014 | Albertus |
| 2016/0164153 A1* | 6/2016 | Kim .................. H01M 8/04201 429/405 |

FOREIGN PATENT DOCUMENTS

| | | |
|---|---|---|
| JP | 2010267476 A | 11/2010 |
| JP | 2011165353 A | 8/2011 |
| JP | 2011165391 A | 8/2011 |
| JP | 2013165051 A | 8/2013 |
| JP | 2016517130 A | 6/2016 |
| KR | 20140004454 A | 1/2014 |
| KR | 20140111066 A | 9/2014 |
| WO | 2015115480 A1 | 8/2015 |

OTHER PUBLICATIONS

Office Action issued for counterpart Japanese Application No. 2017-137226, issued by the Japanese Patent Office dated Dec. 10, 2019 (drafted on Dec. 5, 2019).

Office Action issued for counterpart Korean Application 10-2020-7001568, issued by the Korean Intellectual Property Office dated Jul. 30, 2021.

* cited by examiner

BATTERY SYSTEM AND MOVING BODY

The contents of the following patent applications are incorporated herein by reference: 2017-137226 filed in JP on Jul. 13, 2017 and PCT/JP2018/023171 filed on Jun. 18, 2018

BACKGROUND

1. Technical Field

The present invention relates to a battery system and a moving body.

2. Related Art

Lithium-air batteries have been known, in which oxygen in the air is used as a positive electrode active material and lithium is used as a negative electrode active material (see Patent Document 1, for example).

Patent Document 1: International Publication WO 2015/115480

It is desired to provide a battery system capable of efficient utilization of oxygen.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
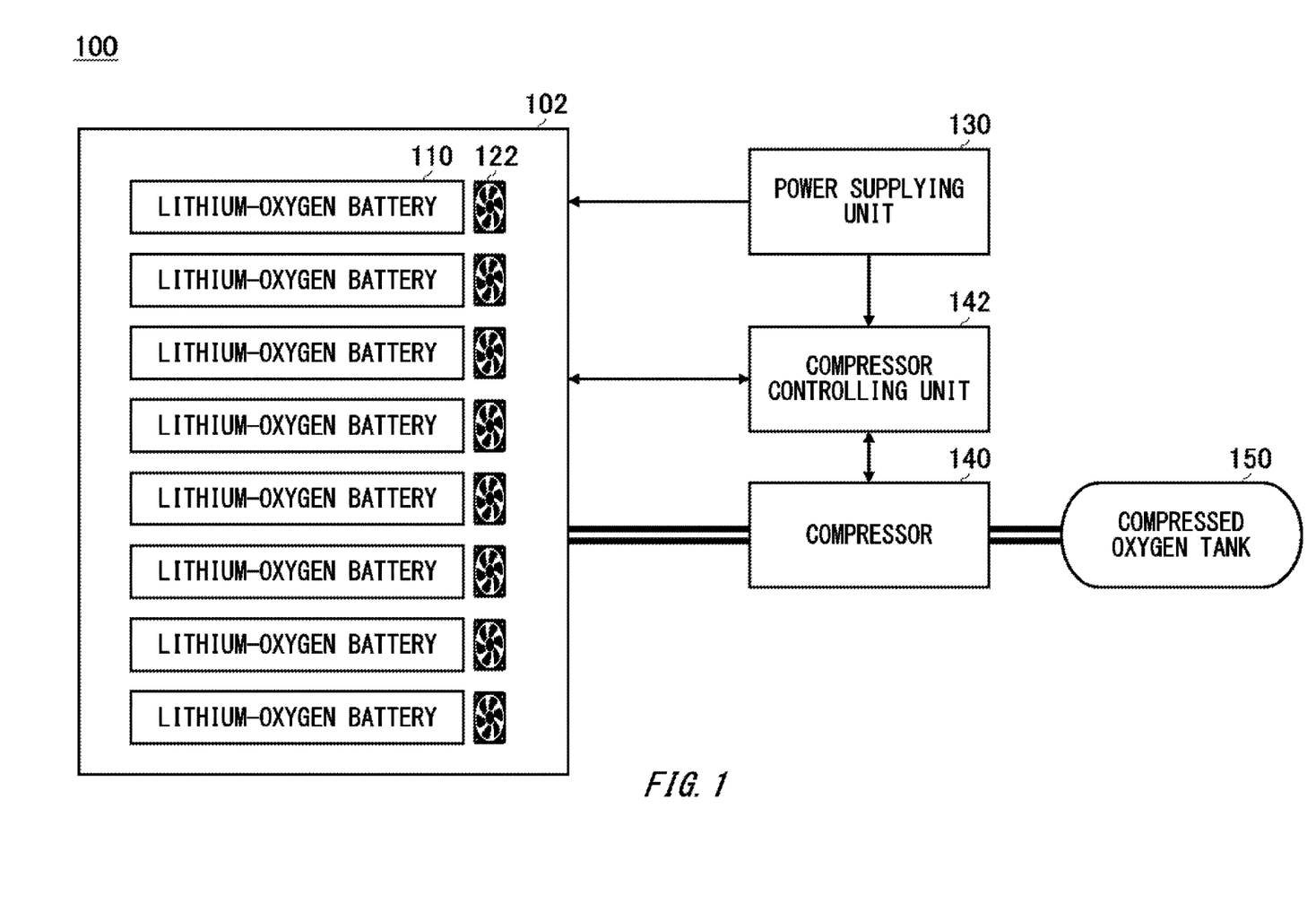
FIG. 1 schematically shows an example of a battery system 100.

FIG. 1 schematically shows an example of a battery system 100. The battery system 100 includes a lithium-oxygen battery 110, an enclosure case 102 enclosing the lithium-oxygen battery 110, a power supplying unit 130, a compressor 140, a compressor controlling unit 142, and a compressed oxygen tank 150.

The enclosure case 102 encloses and contains oxygen and at least one lithium-oxygen battery 110. FIG. 1 shows an example in which the enclosure case 102 contains eight lithium-oxygen batteries 110.

The lithium-oxygen battery 110 may be a battery in which oxygen is used as a positive electrode active material and lithium is used as a negative electrode active material. The lithium-oxygen battery 110 may be what is referred to as a lithium-air battery in which oxygen in the air is used as a positive electrode active material.

During the discharging of the lithium-oxygen battery 110, lithium at the negative electrode dissolves, and lithium peroxide is deposited at the positive electrode side. During the charging of the lithium-oxygen battery 110, lithium peroxide at the positive electrode decomposes, lithium is deposited on the negative electrode, and oxygen is released.

Desirably, the oxygen released from the lithium-oxygen battery 110 during the charging can be reused for the discharging. In the battery system 100 according to the present embodiment, oxygen released from the lithium-oxygen battery 110 is stored in a compressed form. Then, in the battery system 100, the stored oxygen is supplied to the lithium-oxygen battery 110 for discharging the lithium-oxygen battery 110.

Recycling oxygen contained in the enclosure case 102 in this manner enables efficient utilization of oxygen. Compared to the case of using oxygen in the air, it also enables supplying only oxygen to the lithium-oxygen battery 110 and improving the battery performance. Also, storing the compressed oxygen can significantly reduce the space for storage of oxygen as compared to the case without compressing the oxygen. This can realize miniaturization of the battery system 100. If the battery system 100 is installed in a moving body such as a car or airplane, the miniaturization of the battery system 100 contributes to miniaturization of the moving body, for example.

As described above, compared to the conventional case of using oxygen in the environmental air for the discharging and releasing the oxygen into the air during the charging, the battery system 100 according to the present embodiment can achieve at least one of the following effects by recycling oxygen in the enclosure case 102: improving the battery performance; enabling its use e.g., even under low air pressure such as in the stratosphere; and yielding sufficient energy even in an environment with a limited space such as in a submarine, aircraft or car. Thus, an effect of providing a battery system with an increased ratio of power capacity to volume as compared to the conventional case is achieved.

The power supplying unit 130 supplies electrical power to the lithium-oxygen battery 110 to charge the lithium-oxygen battery 110. The power supplying unit 130 may supply electrical power generated by means of any power generation system to the lithium-oxygen battery 110. For example, the power supplying unit 130 supplies electrical power generated by solar power generation to the lithium-oxygen battery 110.

The compressor 140 compresses oxygen released from the lithium-oxygen battery 110. The compressor 140 may compress oxygen released from the lithium-oxygen battery 110 as a result of the power supplying unit 130 charging the lithium-oxygen battery 110. The compressor 140 may be an example of the oxygen compressing unit.

The compressor 140 may be connected to the enclosure case 102, and may compress oxygen contained in the enclosure case 102. The compressor 140 may be connected to the enclosure case 102 via a pipe. The compressor 140 may provide the compressed oxygen to be stored in the compressed oxygen tank 150. The compressed oxygen tank 150 may be an example of the storage unit.

The compressor 140 may supply the oxygen stored in the compressed oxygen tank 150 to the lithium-oxygen battery 110. The compressor 140 may be an example of the oxygen supplying unit. The compressor 140 may be connected to the enclosure case 102, and may supply the oxygen stored in the compressed oxygen tank 150 to the enclosure case 102.

The compressor controlling unit 142 controls the compressor 140. The compressor controlling unit 142 may use electrical power supplied from the power supplying unit 130 for causing the compressor 140 to compress oxygen or to supply oxygen stored in the compressed oxygen tank 150 to the lithium-oxygen battery 110. The compressor controlling unit 142 may also use electrical power provided by the lithium-oxygen battery 110 for causing the compressor 140 to compress oxygen or to supply oxygen stored in the compressed oxygen tank 150 to the lithium-oxygen battery 110.

The compressor controlling unit 142 may cause the compressor 140 to generate electrical power by utilizing the expansive pressure of compressed oxygen stored in the compressed oxygen tank 150. That is, the compressor 140 may generate electrical power by utilizing the expansive pressure of compressed oxygen stored in the compressed oxygen tank 150.

The compressor 140 may include a compressing/expanding unit and a driving/power-generating unit. The compressing/expanding unit compresses and expands oxygen. The driving/power-generating unit drives the compressing/expanding unit to compress oxygen. For example, if the compressor 140 is a displacement compressor, the driving/power-generating unit drives a piston or screw rotor with a motor or the like to compress oxygen. Also, the driving/power-generating unit expands compressed oxygen stored in the compressed oxygen tank 150 to generate electrical power by utilizing its expansive pressure. For example, if the compressor 140 is a displacement compressor, the driving/power-generating unit converts force applied to the piston or screw rotor by the expansive pressure into electrical power. The driving/power-generating unit may generate electrical power by utilizing the expansive pressure in any other way. The compressor controlling unit 142 may supply electrical power generated by the compressor 140 to the lithium-oxygen battery 110 to charge the lithium-oxygen battery 110.

As shown in FIG. 1, the enclosure case 102 may include a blowing fan 122. As shown in FIG. 1, the enclosure case 102 may include a plurality of blowing fans 122 corresponding to the plurality of respective lithium-oxygen batteries 110. Alternatively, the enclosure case 102 may include blowing fans 122 corresponding to the plurality of lithium-oxygen batteries 110 but fewer than the lithium-oxygen batteries 110.

The blowing fan 122 may be disposed in the enclosure case 102 and blow oxygen supplied by the compressor 140 to the enclosure case 102 toward the lithium-oxygen battery 110. The blowing fan 122 may blow oxygen to reach the positive electrode of the lithium-oxygen battery 110.

While in the example of FIG. 1, oxygen stored in the compressed oxygen tank 150 is supplied to the enclosure case 102 via the compressor 140, this is not limited. Oxygen stored in the compressed oxygen tank 150 may be supplied to the enclosure case 102 not via the compressor 140. For example, the compressed oxygen tank 150 and the enclosure case 102 may be connected so that oxygen stored in the compressed oxygen tank 150 is directly supplied to the enclosure case 102. In this case, for example, a valve may be disposed between the compressed oxygen tank 150 and the enclosure case 102 to control whether or not to supply the oxygen by opening or closing the valve.

Figure 2:
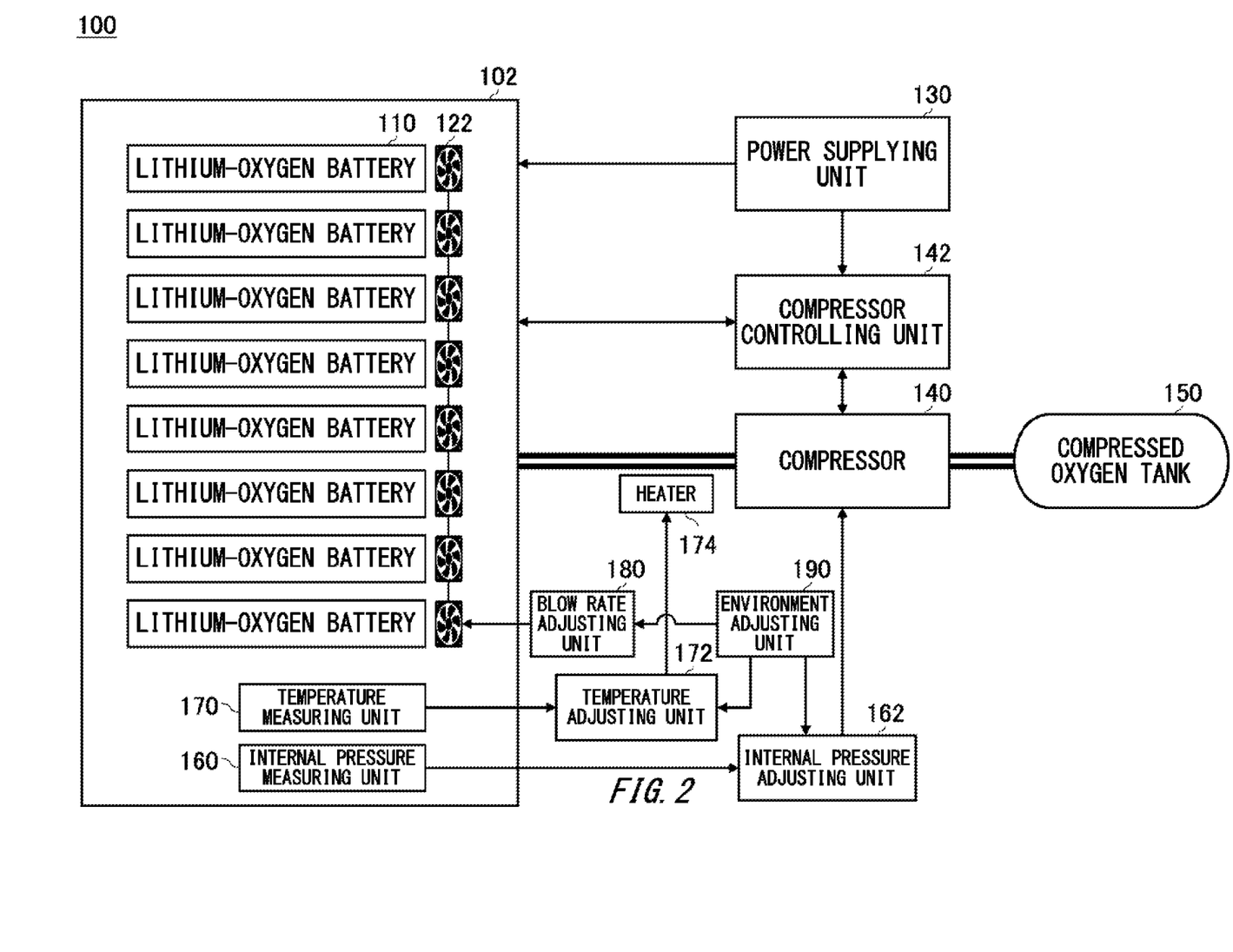
FIG. 2 schematically shows another example of the battery system 100.

FIG. 2 schematically shows another example of the battery system 100. FIG. 2 illustrates a case in which the battery system 100 includes an internal pressure measuring unit 160, an internal pressure adjusting unit 162, a temperature measuring unit 170, a temperature adjusting unit 172, a heater 174, a blow rate adjusting unit 180, and an environment adjusting unit 190, in addition to the components described with reference to FIG. 1. Note that the battery system 100 may not include all of these components and may include only some of them.

The internal pressure measuring unit 160 measures the internal pressure of the enclosure case 102. For example, the internal pressure measuring unit 160 is any pressure sensor disposed in the enclosure case 102 to measure the air pressure in the enclosure case 102.

The internal pressure adjusting unit 162 adjusts the internal pressure of the enclosure case 102. The internal pressure adjusting unit 162 may maintain the internal pressure of the enclosure case 102 within a predetermined range. The predetermined range may be experimentally determined. For example, an experiment may be performed for measuring variation in performance of the lithium-oxygen battery 110 while varying the internal pressure of the enclosure case 102, and a range of the internal pressure of the enclosure case 102 in which the performance of the lithium-oxygen battery 110 exceeds a threshold may be determined as the predetermined range.

The internal pressure adjusting unit 162 may cause the compressor 140 to compress oxygen contained in the enclosure case 102 if the internal pressure of the enclosure case 102 measured by the internal pressure measuring unit 160 is higher than the predetermined threshold. The internal pressure adjusting unit 162 may cause the compressor 140 to supply oxygen stored in the compressed oxygen tank 150 to the enclosure case 102 if the internal pressure of the enclosure case 102 measured by the internal pressure measuring unit 160 is lower than the predetermined threshold.

The internal pressure adjusting unit 162 may adjust the internal pressure of the enclosure case 102 by adjusting the rotation rate of the compressor 140. For example, the internal pressure adjusting unit 162 increases the rotation rate of the compressor 140 to lower the internal pressure of the enclosure case 102.

The battery system 100 may further include a valve to adjust the amount of supplying oxygen stored in the compressed oxygen tank 150 to the enclosure case 102, and the internal pressure adjusting unit 162 may adjust the internal pressure of the enclosure case 102 by controlling the valve.

The internal pressure measuring unit 160 and the internal pressure adjusting unit 162 may use electrical power provided by the lithium-oxygen battery 110. The internal pressure measuring unit 160 and the internal pressure adjusting unit 162 may also use electrical power supplied by the power supplying unit 130.

The temperature measuring unit 170 measures the temperature in the enclosure case 102. For example, the temperature measuring unit 170 is any temperature sensor disposed in the enclosure case 102 to measure the temperature in the enclosure case 102.

The temperature adjusting unit 172 adjusts the temperature in the enclosure case 102. The temperature adjusting unit 172 may maintain the temperature in the enclosure case 102 within a predetermined range. The predetermined range may be experimentally determined. For example, an experiment may be performed for measuring variation in performance of the lithium-oxygen battery 110 while varying the temperature in the enclosure case 102, and a range of the temperature in the enclosure case 102 in which the performance of the lithium-oxygen battery 110 exceeds a threshold may be determined as the predetermined range.

The temperature adjusting unit 172 may adjust the temperature in the enclosure case 102 by heating oxygen supplied from the compressor 140 to the enclosure case 102 using the heater 174, which is provided to a pipe connecting the enclosure case 102 and the compressor 140.

The temperature adjusting unit 172 may adjust the temperature in the enclosure case 102 by heating inside the enclosure case 102 using a heater, which is not shown in the figure, provided in the enclosure case 102.

The enclosure case 102 may be formed of any material capable of maintaining the internal pressure. Also, the enclosure case 102 may have a heat retaining property. The enclosure case 102 may include a thermal insulation material. The thermal insulation material may be a fiber-based thermal insulation material, foam-based thermal insulation material, vacuum thermal insulation material, etc. Specific examples of the fiber-based thermal insulation material include glass wool, rock wool, cellulose fiber, carbonized cork, wool thermal insulation material, etc. Specific examples of the foam-based thermal insulation material include urethane foam, phenolic foam, polystyrene foam, expanded polystyrene foam (EPS), extruded polystyrene foam (XPS), foamed rubber, etc.

While the use of a heater is described in the present example, this is not limited. The temperature adjusting unit 172 may adjust the temperature in the enclosure case 102 by cooling oxygen supplied from the compressor 140 to the enclosure case 102 or the inside of the enclosure case 102. For example, the temperature adjusting unit 172 adjusts the temperature in the enclosure case 102 by cooling oxygen supplied from the compressor 140 to the enclosure case 102 using a Peltier device or the like, which is not shown in the figure, provided to a pipe connecting the enclosure case 102 and the compressor 140, or by cooling inside the enclosure case 102 using a Peltier device or the like provided in the enclosure case 102. The temperature adjusting unit 172 may adjust the temperature in the enclosure case 102 by controlling the heating and cooling of oxygen supplied from the compressor 140 to the enclosure case 102 or the inside of the enclosure case 102.

The compressor controlling unit 142 may control the compressor 140 according to the operating mode of the battery system 100. Operating modes may include a normal mode, a powered mode with a larger amount of electrical power supply than in the normal mode, an eco-mode with a smaller amount of electrical power supply than the normal mode, etc. Operating modes may include only two modes with different amounts of electrical power supply, or may include four or more modes.

For example, when the powered mode is selected, the compressor controlling unit 142 increases the amount of supplying oxygen stored in the compressed oxygen tank 150 to the enclosure case 102. When the eco-mode is selected, the compressor controlling unit 142 may reduce the amount of supplying oxygen stored in the compressed oxygen tank 150 to the enclosure case 102. For example, the compressor controlling unit 142 may adjust the amount of supplying oxygen stored in the compressed oxygen tank 150 to the enclosure case 102 by controlling the rotation rate of the compressor 140 and a valve to adjust the supply amount.

The environment adjusting unit 190 adjusts the environment of the lithium-oxygen battery 110. The environment adjusting unit 190 may adjust the environment of the lithium-oxygen battery 110 by controlling at least one of: the internal pressure of the enclosure case 102; the temperature in the enclosure case 102; and the blow rate of the blowing fan 122.

The environment adjusting unit 190 may adjust the environment of the lithium-oxygen battery 110 according to the operating mode of the battery system 100. For example, when the powered mode is selected, the environment adjusting unit 190 causes the internal pressure adjusting unit 162 to raise the internal pressure of the enclosure case 102, causes the temperature adjusting unit 172 to raise the temperature in the enclosure case 102, or causes the blow rate adjusting unit 180 to increase the blow rate of the blowing fan 122, in order to increase the amount of electricity discharged by the lithium-oxygen battery 110. The environment adjusting unit 190 may perform only one of the three operations, or may perform two or more of them.

For example, when the eco-mode is selected, the environment adjusting unit 190 causes the internal pressure adjusting unit 162 to lower the internal pressure of the enclosure case 102, causes the temperature adjusting unit 172 to lower the temperature in the enclosure case 102, or causes the blow rate adjusting unit 180 to reduce the blow rate of the blowing fan 122, in order to decrease the amount of electricity discharged by the lithium-oxygen battery 110. The environment adjusting unit 190 may perform only one of the three operations, or may perform two or more of them.

When the powered mode is selected, the environment adjusting unit 190 may increase the amount of electricity discharged by the lithium-oxygen battery 110 by collectively controlling the internal pressure of the enclosure case 102, the temperature in the enclosure case 102, and the blow rate of the blowing fan 122. That is, the environment adjusting unit 190 may increase the amount of electricity discharged by the lithium-oxygen battery 110 by performing any combination of: raising or lowering the internal pressure of the enclosure case 102; raising or lowering the temperature in the enclosure case 102; and increasing or reducing the blow rate of the blowing fan 122.

When the eco-mode is selected, the environment adjusting unit 190 may reduce the amount of electricity discharged by the lithium-oxygen battery 110 by collectively controlling the internal pressure of the enclosure case 102, the temperature in the enclosure case 102, and the blow rate of the blowing fan 122. That is, the environment adjusting unit 190 may decrease the amount of electricity discharged by the lithium-oxygen battery 110 by performing any combination of: raising or lowering the internal pressure of the enclosure case 102; raising or lowering the temperature in the enclosure case 102; and increasing or reducing the blow rate of the blowing fan 122.

Figure 3:
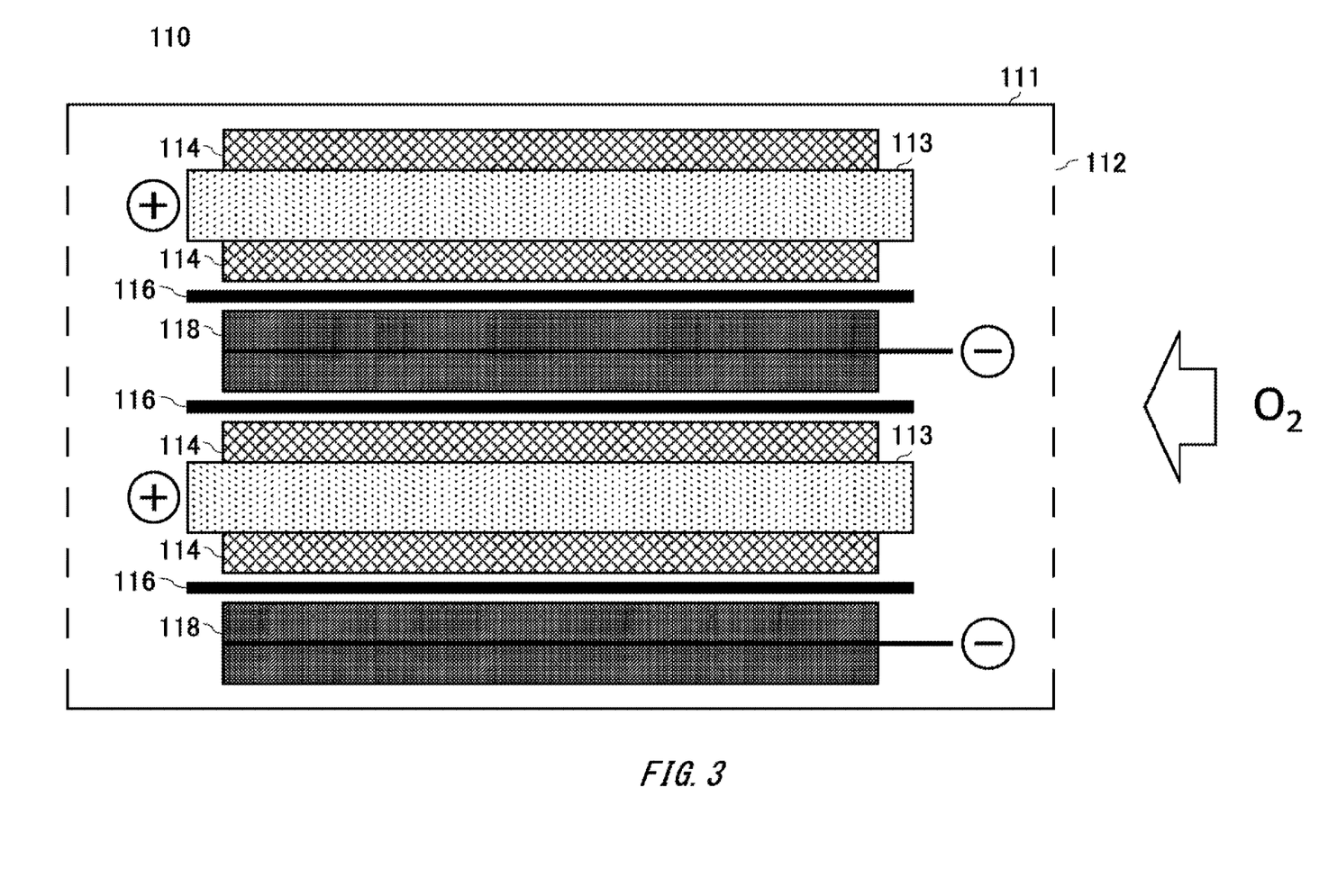
FIG. 3 schematically shows an example of a lithium-oxygen battery 110.

FIG. 3 schematically shows an example of the lithium-oxygen battery 110. The lithium-oxygen battery 110 shown in FIG. 3 includes a porous current collector 113, a porous carbon positive electrode 114, a separator 116, and a lithium metal negative electrode 118, which are covered by a package 111. Porous carbon positive electrodes 114 are disposed on both sides of a porous current collector 113, which is formed of an oxygen-intaking material, and a separator 116 and a lithium metal negative electrode 118 are disposed in parallel, to form a stack. Oxygen in the enclosure case 102 is supplied to the stack via a vent hole 112 formed in the package 111, and the oxygen is supplied to the porous carbon positive electrode 114 via the porous current collector 113, so that a discharge reaction occurs.

The blowing fan 122 may blow oxygen toward the vent hole 112. This can increase the probability of adsorbing oxygen to the porous carbon positive electrode 114.

Note that the constitution of the lithium-oxygen battery 110 shown in FIG. 3 is an example, and the lithium-oxygen battery 110 may have another constitution. For example, the lithium-oxygen battery 110 does not have a stacked structure, and includes a pair of porous carbon positive electrodes 114, a separator 116 and a lithium metal negative electrode 118. The lithium-oxygen battery 110 may also have a stacked structure different from the constitution shown in FIG. 3.

Figure 4:
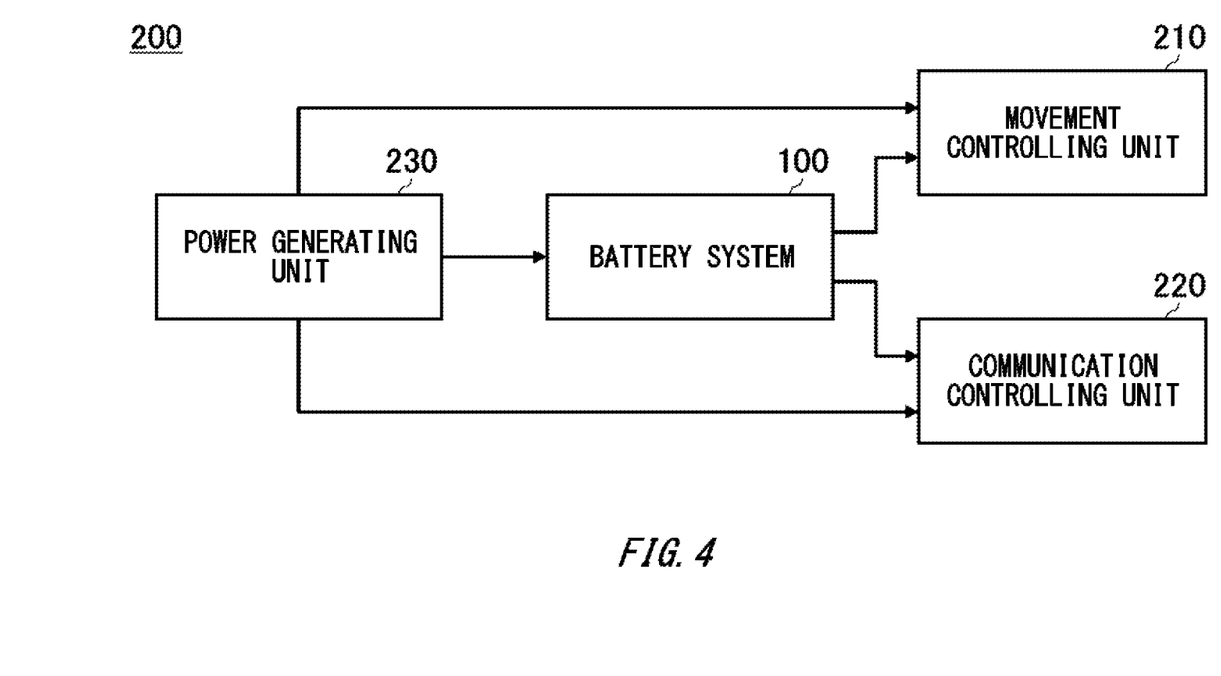
FIG. 4 schematically shows an example of a moving body 200.

FIG. 4 schematically shows an example of a moving body 200. The moving body 200 includes the battery system 100, a movement controlling unit 210, a communication controlling unit 220, and a power generating unit 230. The moving body 200 does not necessarily include all of these components.

The movement controlling unit 210 performs movement control of the moving body 200 using electrical power of the lithium-oxygen battery 110. If the moving body 200 is a vehicle such as a motor vehicle, the movement controlling unit 210 controls the driving of the moving body 200. For example, the battery system 100 may be used as a battery for an electric motor vehicle. If the moving body 200 is a flying body, the movement controlling unit 210 controls the flight of the moving body 200.

The communication controlling unit 220 performs wireless communication using electrical power of the lithium-oxygen battery 110. For example, the communication controlling unit 220 provides a wireless communication service for a wireless communication terminal such as a mobile phone by relaying the wireless communication terminal and a core network. For example, if the moving body 200 is a vehicle such as a motor vehicle, the moving body 200 may serve as a mobile base station vehicle. Also, for example, if the moving body 200 is a flying body, the moving body 200 may serve as a stratospheric platform.

The power generating unit 230 generates electrical power. For example, the power generating unit 230 generates electrical power by solar power generation. The power generating unit 230 may supply the generated electrical power to the power supplying unit 130 of the battery system 100. The power supplying unit 130 may supply the electrical power received from the power generating unit 230 to the lithium-oxygen battery 110, the compressor controlling unit 142, etc.

The power generating unit 230 may supply the generated electrical power to the movement controlling unit 210. The power generating unit 230 may also supply the generated electrical power to the communication controlling unit 220.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

EXPLANATION OF REFERENCES

100: battery system, 102: enclosure case, 110: lithium-oxygen battery, 111: package, 112: vent hole, 113: porous current collector, 114: porous carbon positive electrode, 116: separator, 118: lithium metal negative electrode, 122: blowing fan, 130: power supplying unit, 140: compressor, 142: compressor controlling unit, 150: compressed oxygen tank, 160: internal pressure measuring unit, 162: internal pressure adjusting unit, 170: temperature measuring unit, 172: temperature adjusting unit, 174: heater, 180: blow rate adjusting unit, 190: environment adjusting unit, 200: moving body, 210: movement controlling unit, 220: communication controlling unit, 230: power generating unit

What is claimed is:

1. A battery system comprising:
a lithium-oxygen battery;
an oxygen compressing unit configured to compress oxygen released from the lithium-oxygen battery;
a storage unit configured to store oxygen compressed by the oxygen compressing unit;
an oxygen supplying unit configured to supply oxygen stored in the storage unit to the lithium-oxygen battery;
an enclosure case enclosing the lithium-oxygen battery;
a temperature measuring unit configured to measure a temperature in the enclosure case; and
a temperature adjusting unit configured to maintain the temperature in the enclosure case within a predetermined range; wherein
the oxygen compressing unit and the oxygen supplying unit are connected to the enclosure case, and
the temperature adjusting unit adjusts the temperature in the enclosure case by heating inside the enclosure case with a heater provided in the enclosure case.

2. The battery system according to claim 1, wherein
the oxygen supplying unit supplies oxygen stored in the storage unit to the enclosure case, and
the battery system further comprises a blowing fan disposed in the enclosure case and configured to blow oxygen supplied by the oxygen supplying unit toward the lithium-oxygen battery.

3. The battery system according to claim 1, comprising:
an internal pressure measuring unit configured to measure an internal pressure of the enclosure case; and
an internal pressure adjusting unit configured to maintain the internal pressure of the enclosure case within a predetermined range.

4. The battery system according to claim 3, wherein the internal pressure adjusting unit causes the oxygen compressing unit to compress oxygen contained in the enclosure case if the internal pressure of the enclosure case is higher than a predetermined threshold, and causes the oxygen supplying unit to supply oxygen stored in the storage unit to the enclosure case if the internal pressure of the enclosure case is lower than the predetermined threshold.

5. The battery system according to claim 3, wherein
the oxygen supplying unit is a compressor, and
the internal pressure adjusting unit maintains the internal pressure of the enclosure case by adjusting a rotation rate of the compressor.

6. The battery system according to claim 3, wherein the internal pressure adjusting unit maintains the internal pressure of the enclosure case by controlling a valve to adjust an amount of supplying oxygen stored in the storage unit to the enclosure case.

7. The battery system according to claim 1, wherein the temperature adjusting unit adjusts the temperature in the enclosure case by heating oxygen supplied from the oxygen supplying unit to the enclosure case.

8. The battery system according to claim 1 wherein the enclosure case has a heat retaining property.

9. The battery system according to claim 8, wherein the enclosure case comprises a thermal insulation material.

10. The battery system according to claim 2, further comprising:
a blow rate adjusting unit configured to adjust a blow rate of the blowing fan;
an internal pressure measuring unit configured to measure an internal pressure of the enclosure case;
an internal pressure adjusting unit configured to adjust the internal pressure of the enclosure case;
a temperature measuring unit configured to measure a temperature in the enclosure case; and
a temperature adjusting unit configured to adjust the temperature in the enclosure case.

11. The battery system according to claim 10, further comprising an environment adjusting unit configured to adjust an environment of the lithium-oxygen battery by controlling at least one of: adjustment of the blow rate performed by the blow rate adjusting unit; adjustment of the internal pressure of the enclosure case performed by the internal pressure adjusting unit; and adjustment of the temperature in the enclosure case performed by the temperature adjusting unit.

12. The battery system according to claim 11, wherein the environment adjusting unit adjusts the environment of the lithium-oxygen battery according to an operating mode of the battery system.

13. The battery system according to claim 1, wherein the oxygen compressing unit is a compressor.

14. The battery system according to claim 13, wherein the oxygen supplying unit is the compressor.

15. The battery system according to claim 13, wherein the compressor compresses oxygen using electrical power of the lithium-oxygen battery.

16. The battery system according to claim 13, wherein the compressor generates electrical power by utilizing expansive pressure of compressed oxygen stored in the storage unit.

17. The battery system according to claim 1, comprising a power supplying unit configured to supply electrical power to the lithium-oxygen battery to charge the lithium-oxygen battery, wherein
the oxygen compressing unit compresses oxygen released from the lithium-oxygen battery as a result of the power supplying unit charging the lithium-oxygen battery.

18. The battery system according to claim 17, wherein the power supplying unit supplies electrical power generated by solar power generation to the lithium-oxygen battery.

19. A moving body comprising:
the battery system according to claim 1; and
a movement controlling unit configured to perform movement control using electrical power of the lithium-oxygen battery.

20. A moving body comprising:
the battery system according to claim 1; and
a wireless communication unit configured to perform wireless communication using electrical power of the lithium-oxygen battery.

21. The moving body according to claim 19, wherein the moving body is capable of flying and serves as a stratospheric platform.

* * * * *